United States Patent [19]
Philippe

[11] Patent Number: 5,022,506
[45] Date of Patent: Jun. 11, 1991

[54] DOUBLE SYNCHRONIZER HAVING INTEGRATED AXIAL LOCKING MEANS

[75] Inventor: Chrétien Philippe, Croissy, France

[73] Assignees: Automobiles Peugeot, Paris; Automobiles Citroen, Neuilly S/Seine, both of France

[21] Appl. No.: 459,377

[22] Filed: Dec. 29, 1989

[30] Foreign Application Priority Data

Dec. 30, 1988 [FR] France ................. 88 17529

[51] Int. Cl.$^5$ ............................. F16D 23/06
[52] U.S. Cl. ..................... 192/53 G; 192/53 F; 192/53 E; 74/339
[58] Field of Search ............ 192/53 G, 53 F, 53 E, 192/53 R; 74/339

[56] References Cited

U.S. PATENT DOCUMENTS

| 2,900,059 | 8/1959 | Zittrell et al. ............ 192/53 F |
| 4,641,734 | 2/1987 | Muller et al. ............ 192/53 F |
| 4,712,662 | 12/1987 | Elverdam ............ 192/53 F |

FOREIGN PATENT DOCUMENTS

| 0157908 | 10/1985 | European Pat. Off. .......... 192/53 G |
| 926468 | 4/1955 | Fed. Rep. of Germany .... 192/53 F |
| 1042978 | 11/1958 | Fed. Rep. of Germany .... 192/53 F |
| 2222077 | 11/1973 | Fed. Rep. of Germany ... 192/53 G |
| 2029519 | 3/1980 | United Kingdom ............. 192/53 G |
| 2166206 | 4/1986 | United Kingdom ............. 192/53 F |

Primary Examiner—Leslie A. Braun
Assistant Examiner—Andrea Pitts
Attorney, Agent, or Firm—Burns, Doane, Swecker & Mathis

[57] ABSTRACT

A double synchronizer for two gear pinions (14A, 14B) freely mounted on each side of a hub (12) fixed to a shaft (10) and on which is axially slidably mounted a control sleeve (22) for the purpose of occupying a plurality of axial positions defined by locking means (26A, 40A) comprising a plurality of radial push means (26A) having balls (32A), each of the balls (32A) of the radial push means being elastically biased outwardly so as to cooperate with an inner notched axial track (40A) on the sleeve. According to the invention, the push means comprise two series of push means (26A) evenly and alternately spaced about the axis X—X of the hub (12), each of the two series being associated with a synchronizer of one of the two gear pinions.

4 Claims, 2 Drawing Sheets

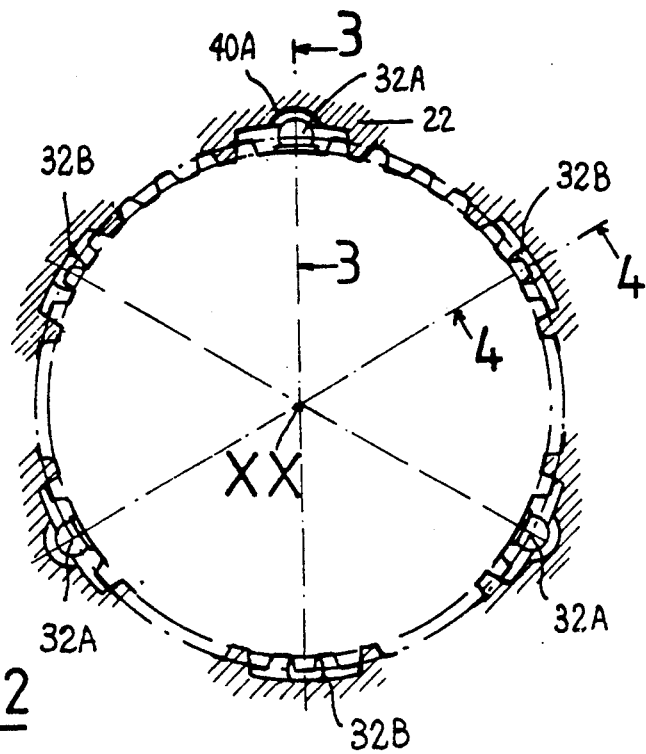
FIG. 2
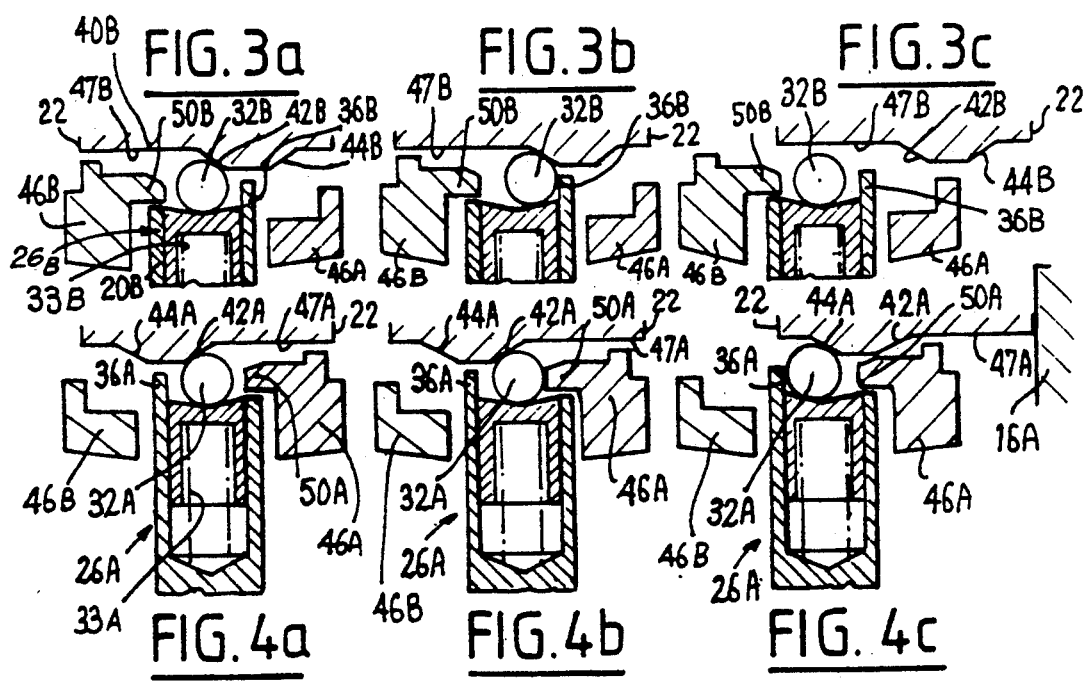
FIG. 3a   FIG. 3b   FIG. 3c
FIG. 4a   FIG. 4b   FIG. 4c

DOUBLE SYNCHRONIZER HAVING INTEGRATED AXIAL LOCKING MEANS

The present invention relates to a double synchronizer in particular for a gearbox of an automobile vehicle.

Synchronizers are small clutches maintained engaged by the change-speed control during the time required to obtain the equalization of the angular speeds of the elements to be clutched. The invention concerns the positive category of synchronizers which do not permit the engagement of the dog clutch teeth so long as the exact synchronization of the speeds has not been obtained.

The invention relates more particularly to a double synchronizer for two gear pinions freely rotatively mounted on a shaft on each side of a hub fixed to the shaft and on which a control sleeve is axially slidably mounted for the purpose of occupying a plurality of axial positions defined by locking means.

Synchronizers of this type are known in which the locking means comprise a plurality of radial push means including balls arranged in a common median plane of the hub and positioned perpendicular to the axis of the hub, each of the balls being elastically biased so as to cooperate with a notched or stepped inner axial track of the sleeve.

Each synchronizer comprises an intermediate friction ring connected to rotate with the sleeve, axially movable between the hub and the associated gear pinion and including a conical friction surface which cooperates with a complementary surface of the gear pinion when it is shifted axially toward the gear pinion by driving means comprising in particular an arming ramp formed in each of the corresponding tracks.

Each synchronizer further comprises dog clutch teeth provided respectively on the gear pinion and in the vicinity of the corresponding end of the sleeve, which teeth cooperate for coupling the gear pinion to the sleeve when the latter occupies its corresponding axial end position of engagement.

One of the main problems in the development of such a double synchronizer resides in a compromise between the high frictions required during the synchronization stage proper and frictions reduced to a minimum when the synchronizer is in its neutral position or position of engagement.

To obtain a good compromise, it is necessary to arrange that each of the parts be axially positioned in a very precise manner during the different stages of the actuation of the driving sleeve for changing a speed of the gearbox.

This actuation is divided up in the following manner. The force applied on the sleeve in starting at the neutral position is transmitted to the friction ring during the arming stage. The friction ring which rotates with the sleeve is shifted axially in such manner as to come to rub against the conical surface connected to the gear pinion to be coupled so as to bring about the synchronization of the speeds. When this synchronization has been achieved, the coupling of the hub and gear pinion is achieved by interengagement of the dog teeth on the sleeve and the dog teeth on the gear pinion.

The design of the aforementioned synchronizers, in which the means for locking in the neutral position are integrated with the hub, permit avoiding the phenomenon of a residual slight rubbing or "licking" of the synchronizer by ensuring the return of the sleeve to the median neutral position with no axial play.

According to an arrangement whereby this result can be achieved, the balls of the push means are received radially between two confronting ramps which are respectively provided on the hub fixed to the shaft and provided on the sleeve. The ramp on the hub is for example formed by a conical seat of an end surface of the push means.

However, in this arrangement it has been found that it is impossible to integrate position locking means, arranged in the form of push means having balls, which permit ensuring a precise maintenance of the engaged axial positions. Indeed, as the balls all act alternately for arming one or the other of the two synchronizers, such a combination would produce, when disengaging one of the speed ratios, a slight rubbing in the synchronizer of the opposite speed ratio gear pinion corresponding to its arming. This slight rubbing would be harmful, since it would produce a torque which would have for effect to urge the sleeve against the usual "anti-release" ramps of its dog clutch splines. It would in this way penalize the disengaging force in a manner similar to an incomplete clutch release.

An object of the present invention is to provide a double synchronizer in which all of the axial positions of the sleeve are determined with precision and with no axial play by push means having balls.

The invention therefore provides a double synchronizer of the type mentioned hereinbefore, wherein the push means comprise two series of push means arranged alternately and in evenly spaced relation around the axis of the hub, each of the two series of push means being associated with the respective synchronizer of one of the two gear pinions, each ball of one series of push means cooperating on one hand with an abutment connected to the hub which opposes any axial displacement of the ball in the direction away from the associated gear pinion and, on the other hand, with a respective one of said axial tracks which includes a planar portion extending from the mediam plane of the sleeve in the direction toward the associated gear pinion and axially defined in the direction toward the other gear pinion by an arming notch or step comprising an arming ramp inclined in the direction toward the axis and an inverse engagement ramp which cooperates with the ball for axially immobilizing the sleeve in the position of engagement corresponding to the coupling of the associated gear pinion, and the means for driving the associated intermediate ring further comprise a connection member which ensures the transmission of the thrust force exerted by the sleeve on each ball to the friction ring which cooperates with the associated gear pinion.

According to other features of the invention:

the connection member is an axial lug connected to the associated friction ring and having a free end cooperative with the confronting ball;

the abutment is a radial lug having a surface arranged in confronting relation to the ball;

each of the radial push means comprises a hollow conical seat on which the ball rests, the angle of inclination of the cone of the seat relative to the axis of the synchronizer being less than those of the arming and engagement ramps so as to ensure the centering without play of the sleeve relative to the hub in its median neutral axial position.

Further features and advantages of the invention will be apparent from the following detailed description with reference to the accompanying drawings, in which:

FIG. 2 is a simplified sectional view taken on line 2—2 of FIG. 1, with portions removed for the sake of clarity;

Figure 1:
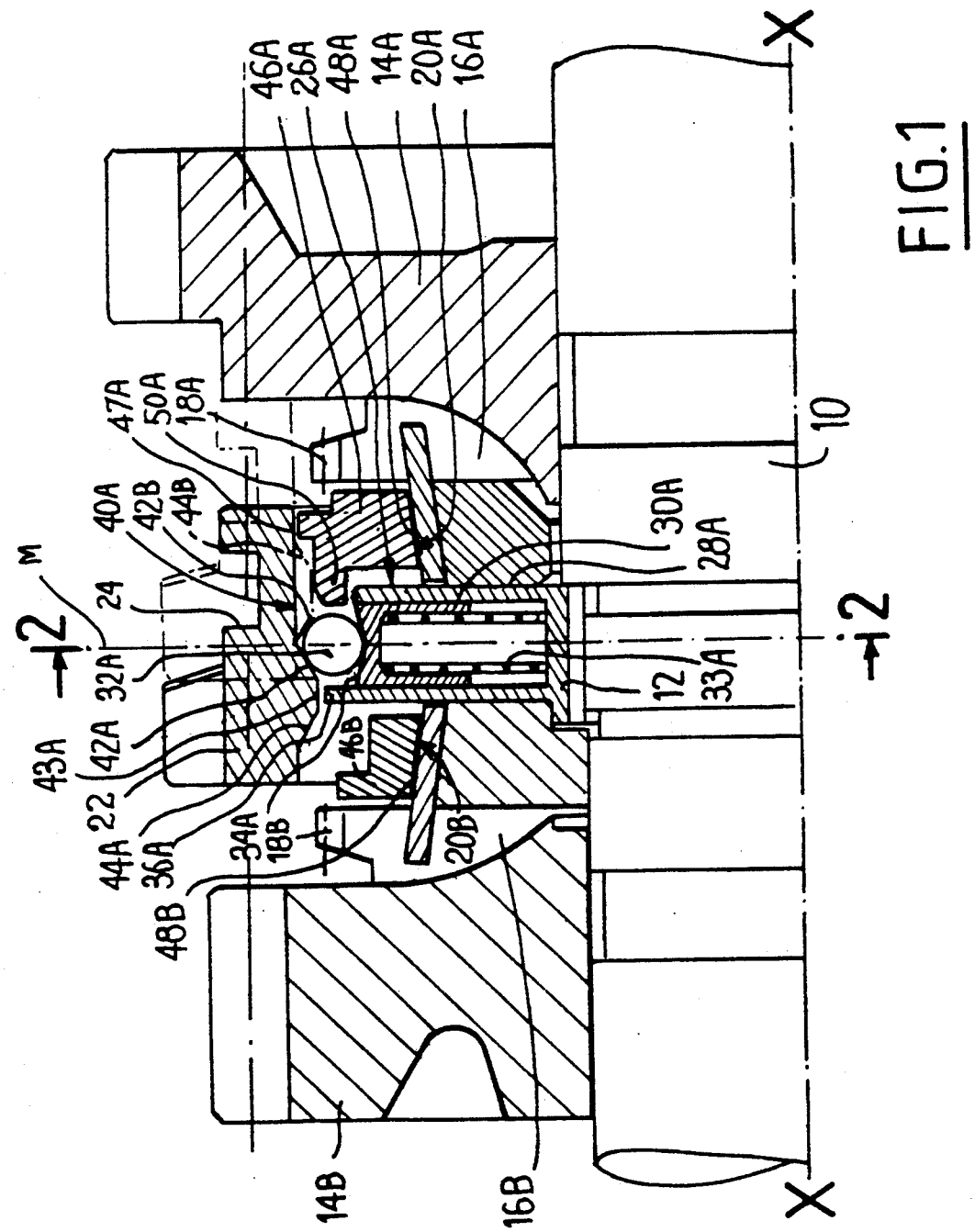
FIG. 1 is an axial sectional view of a double synchronizer arranged in accordance with the teaching of the invention and shown in the neutral position, one of the two speed engagement positions being shown in dot-dash lines.

FIGS. 3a, 3b and 3c are detailed sectional views taken on line 3—3 of FIG. 2 which respectively correspond to the neutral, arming and engagement positions of the synchronizer with one of the two gear pinions, and FIGS. 4a, 4b and 4c are sectional views similar to FIGS. 3a, 3b and 3c, taken on line 4—4 of FIG. 2.

As the arrangement of the double synchronizer represented in FIG. 1 is broadly symmetrical relative to its median plane M, all of the components relating to a first synchronizer, on the right side as viewed in FIG. 1, will be indicated by reference numerals with the index A, while the components of the other synchronizer will be indicated by the same reference numerals with the index B.

Shown in FIG. 1 is a shaft 10 on which a hub 12 is axially fixed and prevented from rotating. Disposed on each side of the hub 12 relative to its median plane M are two gear pinions 14A and 14B which are prevented from moving axially but are free to rotate on the shaft 10.

The gear pinions 14A and 14B are provided with an axial extension 16A, 16B on the periphery of which dog clutch teeth 18A and 18B are formed.

Each of the gear pinions 14A and 14B comprises a conical friction surface 20A, 20B which faces outwardly relative to the axis of rotation X—X of the shaft 10.

The double synchronizer further comprises a control sleeve 22 which is axially movable relative to the hub 12 under the action of a control fork (not shown) which is received in a fork groove 24 formed in the outer cylindrical surface of the sleeve 22.

The different axial positions of the sleeve 22 relative to the hub 12 result from cooperation between the sleeve 22 and locking means formed by push means 26A and 26B having balls.

Each of the series of ball push means 26A and 26B comprises three radial push means which are arranged in alternating and evenly-spaced relation about the axis X—X of the hub 12.

The push means 26A comprise a bore 28A which extends radially in the hub 12 and in which is received a push piston 30A which radially outwardly biases a locking ball 32A under the effect of a spring 33A.

The ball 32A rests on a hollow conical seat 34A formed at the free end of the piston 30A.

The hub 12 further comprises three abutment lugs 36A each of which extends radially in confronting relation to the respective ball 32A so as to limit the axial displacements of the ball 32A relative to the hub 12 in the direction toward the gear pinion 14B.

In a symmetrical manner, the hub also comprises three abutment lugs 36B which extend radially outwardly for the purpose of preventing the axial displacements of the respective balls 32B relative to the hub 12 in the direction toward the gear pinion 14A.

Each of the balls 32A of the first series of radial push means is received in a respective inner axially extending track 40A provided in the inner cylindrical surface of the sleeve 22. Likewise, each of the balls 32B is received in a respective axially extending track 40B in the inner cylindrical surface of the sleeve 22.

The track 40A defines an arming notch or step constituted by an arming ramp 42A which extends from the median plane M in the direction toward the axis X—X and which is extended, toward the left as viewed in FIG. 1, by a flat surface 43A followed by an engagement ramp 44A. The track 40A also includes a rectilinear planar portion 47A which extends from the median plane M, toward the right as viewed in FIG. 1, in the direction toward the gear pinion 14A and away from the arming notch.

In a symmetrical manner relative to the plane M, each track 40B comprises an arming notch or step defined by an arming ramp 42B and an engagement ramp 44B which are interconnected by a flat surface 43B.

Each synchronizer further comprises an intermediate friction ring 46A, 46B which is axially disposed between the associated gear pinion and the hub 12 so that its inner conical friction surface 48A, 48B is capable of cooperating with the confronting outer conical surface 20A, 20B.

The means for actuating each of the friction rings 46A, 46B by the effect of an axial thrust exerted by the sleeve 22 are constituted by the balls 32A, 32B which cooperate with axial lugs or heels 50A, 50B which in one piece with the friction ring and have a free end surface in confronting relation to the respective ball 32A, 32B and radial abutment lug 36A, 36B. The intermediate friction rings 46A, 46B are of course connected to rotate with the sleeve 22, the latter being, however, free to slide axially relative to these friction rings.

The operation of the double synchronizer will now be described with reference to in particular the series of FIGS. 3 and 4.

When the double synchronizer is in its neutral position illustrated in FIG. 1, FIG. 3a and FIG. 4a, the balls 32A and 32B of each of the series of radial push means 26A and 26B are in bearing relation against the respective arming ramps 42A and 42B in the tracks 40A and 40B.

Under the action of the springs 33A and 33B of the push means, the two series of balls 32A and 32B consequently ensure, in cooperation and with no axial play, the maintenance of the sleeve 22 in the median neutral position owing to the choice of the angles of the conical seats 34A, 34B and of the angles of the arming ramps 42A and 42B.

All of the operations for achieving the synchronization and the engagement with the gear pinion 14A will now be described.

If there is exerted by means of the control fork in the groove 24 an axial thrust, toward the right as viewed in the Figures, on the sleeve 22, the arming ramps 42A urge the balls 32A axially toward the right until they come into contact with the axial connection lugs 50A of the intermediate friction ring 46A. This contact has for effect to bring the friction surfaces 20A and 48A also into contact with each other and consequently to cause the gear pinion 14A to rotate under the effect of the friction between these friction surfaces.

When the synchronization speed is reached, pursuance of the axial thrust on the sleeve 22 causes the radially inward withdrawal of the balls 32A in opposition to the forces exerted by the springs 33A so as to permit the gear pinion 14A to be coupled by the dog clutch and driven in rotation by the shaft 10.

In this way, the axial end position toward the right of the sleeve 22 shown in FIGS. 3c and 4c is reached, in which the balls 32A bear elastically against the engagement ramps 44A of the tracks 40A, which maintains the sleeve in axial bering relation against the extension 16A of the gear pinion.

It will be observed that, in the course of all of the axial movements of the sleeve 22 toward the right, the balls 32B of the other series of radial push means 26B were not driven axially toward the right owing to the existence of the respective radial abutment lugs 36B and rectilinear planar portions 47B of the axial tracks 40B.

All of the operations just described are symmetrically applicable for achieving the synchronization of, and the engagement with, the opposite gear pinion 14B.

It will also be easily understood that the return of the sleeve 22 to its median neutral position occurs, after overcoming an increased resistance due to the cooperation of the balls 32A with the ramps 44A, without having any harmful effect on the opposite synchronizer, owing to the axial stoppage of the balls 32A against their respective abutments 36A and to the space between the balls 32B and their respective arming ramps 42B.

I claim:

1. Double synchronizer for two gear pinions, said double synchronizer comprising a shaft, a hub which is fixed to the shaft and has a common axis with the shaft, the two gear pinions being freely rotatively mounted on the shaft axially on each side of the hub and associated with a respective synchronizer of the double synchronizer, a control sleeve having a median plane perpendicular to said axis and axially slidably mounted relative to the hub for the purpose of occupying a plurality of axial positions, locking means defining said axial positions of the sleeve and comprising a plurality of inner axially extending stepped tracks on the sleeve, and a plurality of push means including balls and extending radially of said axis in a common median plane perpendicular to said axis, means for elastically biasing each of the balls of the push means outwardly relative to said axis so as to cause each ball to cooperate with a respective one of the inner axial stepped tracks, each synchronizer of the double synchronizer further comprising an intermediate friction ring connected to rotate with the sleeve, axially movable between the hub and the associated gear pinion and defining a conical friction surface, a surface on said associated gear pinion which is complementary to and cooperative with the conical friction surface defined by the intermediate friction ring when the intermediate friction ring is axially urged toward said associated gear pinion, driving means for urging the intermediate friction ring toward said associated gear pinion and comprising an arming ramp formed in each of the respective tracks for engaging the respective ball, each synchronizer of said double synchronizer further comprising dog clutch teeth which are respectively provided on the associated gear pinion and in the vicinity of a corresponding axial end of the sleeve and which are cooperative for coupling the associated gear pinion with the sleeve when the sleeve occupies a corresponding end axial engagement position, said push means comprising two series of push means evenly and alternately spaced apart around said axis, each series of said two series of push means being associated with the respective synchronizer of the respective one of the two gear pinions, an abutment being provided on the hub for each ball of each of said two series of the push means and cooperative with the respective ball for opposing any movement of the ball axially of the hub in a direction away from the associated gear pinion, each axial track including a planar portion extending from the median plane of the sleeve in a direction toward the associated gear pinion, an arming step portion delimiting said planar portion axially in a direction away from said associated gear pinion and toward the other gear pinion, the arming step portion defining said arming ramp which is inclined in a direction toward said axis and an inverse engagement ramp which is cooperative with the respective ball for axially immobilizing the sleeve in said corresponding end axial engagement position corresponding to said coupling of the associated gear pinion with the sleeve, said driving means further comprising for each ball a connection member for ensuring a transmission of a thrust force exerted by the sleeve on each ball to a respective friction ring cooperative with the associated gear pinion wherein said connection member is an axial lug which is connected to the respective friction ring and has a free end cooperative with the respective confronting ball.

2. Synchronizer according to claim 1, wherein said abutment is a radial lug having a surface which is in confronting relation to the respective ball.

3. Synchronizer according to claim 1, wherein each of the radial push means comprise means defining a hollow conical seat against which seat the respective ball rests, the cone of the seat having an inclination relative to said axis which is less than the inclination of said arming ramp and the inclination of said engagement ramp of the respective axial track relative to said axis for ensuring a centering of the sleeve without play in a median neutral axial position relative to the hub.

4. Synchronizer according to claim 1, wherein, in the position of engagement of a gear, the sleeve is maintained in axial bearing relationship against a portion of the gear pinion due to the cooperation of the balls which are elastically bearing against said engagement ramps.

* * * * *